United States Patent [19]

Matsuda et al.

[11] 3,997,491
[45] Dec. 14, 1976

[54] PROCESS FOR PREPARATION OF ANIONIC RESINOUS AQUEOUS EMULSIONS

[75] Inventors: Kazuo Matsuda; Hidemasa Ohmura, both of Wakayama; Yukihisa Niimi, Osaka, all of Japan

[73] Assignee: Kao Soap Co., Ltd., Tokyo, Japan

[22] Filed: Aug. 15, 1975

[21] Appl. No.: 604,934

[30] Foreign Application Priority Data

Aug. 23, 1974 Japan .............................. 49-96781

[52] U.S. Cl. .............................. 260/29.2 TN; 8/194; 260/77.5 AM
[51] Int. Cl.² .................. C08G 18/71; D06M 15/52
[58] Field of Search ........................... 260/29.2 TN

[56] References Cited
UNITED STATES PATENTS

| | | | |
|---|---|---|---|
| 3,836,493 | 9/1974 | Matsuda et al. | 260/29.2 TN |
| 3,903,031 | 9/1975 | Matsuda et al. | 260/29.2 TN |
| 3,903,032 | 9/1975 | Matsuda et al. | 260/29.2 TN |
| 3,928,271 | 12/1975 | Matsuda et al. | 260/29.2 TN |
| 3,951,897 | 4/1976 | Matsuda et al. | 260/29.2 TN |

*Primary Examiner*—Murray Tillman
*Assistant Examiner*—A. H. Koeckert
*Attorney, Agent, or Firm*—Woodhams, Blanchard and Flynn

[57] ABSTRACT

A process for the preparation of anionic resinous aqueous emulsions useful for the treatment of fiber-containing products, comprising reacting an isocyanate-terminated urethane prepolymer with an excess of a polyalkylene polyamine to form a polyurethane-urea-polyamine, then reacting a part of the amino groups in the polyurethane-urea-polyamine with a compound selected from the group consisting of alkyl isocyanates in which the alkyl group has 12 to 22 carbon atoms and alpha-olefin epoxides having 12 to 22 carbon atoms, thereby to introduce a long-chain alkyl group into the molecule, reacting the thus-formed product having some unreacted amino groups with a cyclic dicarboxylic acid anhydride, and mixing the resulting reaction product with an aqueous solution of a basic substance.

11 Claims, No Drawings

PROCESS FOR PREPARATION OF ANIONIC RESINOUS AQUEOUS EMULSIONS

BACKGROUND OF THE INVENTION

1. Field of the Invention

This invention relates to a process for preparing anionic resinous aqueous emulsions useful for the treatment of fiber-containing products.

2. Description of the Prior Art

It is well known that polyurethane resins have good elasticity, and they have heretofore been used widely in various fields as adhesives, binders for non-woven fabrics, resinous components for artificial leathers, and the like. In general, they are used in the form of organic solvent solutions.

Conventional fiber-treating agents such as softening agents, antistatic agents and resin processing agents are generally used in aqueous systems. Accordingly, when a polyurethane resin is used together with conventional fiber-treating agents, it is preferred that the resin be water-soluble or that it be in the form of an aqueous emulsion.

Although polyurethane resins possess excellent physical properties as elastomers, because they contain in the molecule many hydrogen groups of carboamides, they have a large intermolecular cohesive force and they are poorly soluble in non-polar solvents. Accordingly, it is very difficult to form aqueous emulsions of polyurethane resins.

There is known a method for preparing stable emulsions by reacting an isocyanate-terminated urethane prepolymer with an excess of a polyalkylene polyamine to form a polyurethane-urea-polyamine, and rendering anionic the amino groups in the thus-formed polyurethane-urea-polyamine. The thus-formed emulsion gives an excellent rubbery elasticity when dried, and it is effective as a binder for fibers, papers, leathers, woods and construction materials. However, it is insufficient in the softness which is a very important requirement for fiber-treating agents.

SUMMARY OF THE INVENTION

We have discovered that when the above-mentioned polyurethane-urea-polyamine is partially reacted with a compound to introduce a long-chain alkyl group into the molecule and the remaining unreacted amino groups are rendered anionic, there is obtained a resinous aqueous emulsion which imparts to fibers not only elasticity and crease resistance, but also a soft touch and excellent washing fastness, when the emulsion is used as a fiber-treating agent.

In accordance with this invention, there is provided a process for preparing anionic resinous aqueous emulsions useful for the treatment of fiber-containing products, which comprises reacting an isocyanate-terminated urethane prepolymer with an excess of a polyalkylene polyamine to form a polyurethane-urea-polyamine, then reacting a part of the amino groups in the polyurethane-urea-polyamine with a compound selected from the group consisting of alkyl isocyanates in which the alkyl group has 12 to 22 carbon atoms and alpha-olefin epoxides containing 12 to 22 carbon atoms, to introduce a long-chain alkyl group into the molecule, reacting the thus-formed product having the remaining amino groups unreacted with a cyclic dicarboxylic acid anhydride, and mixing the resulting reaction product with an aqueous solution of a base.

The polyurethane-urea-polyamine used in this invention is obtained by reacting an isocyanate-terminated urethane polymer, which is prepared from a polyhydroxyl compound and an excess of a polyfunctional isocyanate, with a polyalkylene polyamine in a ketone type solvent.

As the polyfunctional isocyanate used as the starting material for the preparation of the urethane prepolymer, there are preferably employed aromatic, alicyclic and aliphatic diisocyanates such as 1,5-naphthylene diisocyanate, 4,4'-diphenylmethane diisocyanate, 4,4'-diphenyldimethylmethane diisocyanate, di- and tetraalkyldiphenylmethane diisocyanates, 4,4'-dibenzylisocyanate, 1,3-phenylene diisocyanate, 1,4-phenylene diisocyanate, tolylene diisocyanate, chlorinated isocyanates, brominated isocyanates, phosphorus-containing isocyanates, butane-1,4-diisocyanate, hexane-1,6-diisocyanate, dicyclohexylmethane diisocyanate, xylylene diisocyanate and the like.

The polyhydroxyl compound used for preparing the above urethane prepolymer is a compound having a molecular weight of 200 to 10,000. Known polyhydroxyl compounds generally used for preparation of polyurethanes, such as polyethers, polyesters, polyester amides, polyacetals, polythioethers and polybutadiene glycols, can be used in this invention.

As the polyethers that can be used as such polyhydroxyl compound, there can be mentioned, for example, homopolymers, copolymers and graft copolymers of tetrahydrofuran, ethylene oxide, propylene oxide, butylene oxide and the like. Further, there can be employed homogeneous or mixed polyethers formed by polymerization of hexane diol, methylhexane diol, heptane diol and octane diol. Still further, propoxylated and ethoxylated glycols can be used.

As the polythioethers that can be used as such polyhydroxyl compound, there are preferably employed condensation products of thioglycols alone or with other glycols.

As the polyacetals, there can be mentioned water-soluble polyacetals formed from hexane diol and formaldehyde or from 4,4'-dihydroxyethoxydiphenyldimethyl methane and formaldehyde.

As typical examples of the polyesters, there can be mentioned polyester glycols obtained by dehydrating condensation of dibasic acids and saturated or unsaturated low-molecular weight glycols such as ethylene glycol, propylene glycol, 1,3-butanediol, 1,4-butanediol, neopentyl glycol, pentanediol, hexanediol, octanediol, 2-ethyl-1,3-hexanediol, 1,4-butynediol, bisphenol A, diethylene glycol, dipropylene glycol and the like, and polyester glycols obtained by ring-opening polymerization of cyclic ester compounds.

If desired, conventional glycols such as ethylene glycol, di- and tri-ethylene glycols, butane diol, propane diol, 1,6-hexane diol and neopentyl glycol can be used in combination with the above-mentioned polyols.

In this invention, as the polyalkylene polyamine, there can be used a variety of polyalkylene polyamines including polyethylene polyamine, polypropylene polyamine, polybutylene polyamine and the like. More specifically, the polyalkylene polyamine used in this invention is a polyamine in which the nitrogen atoms are connected through groups of the formula $-C_nH_{2n}-$ in which n is an integer of at least 1, preferably 2 to 6, and the number of such groups is between 2 and about 4. The nitrogen atoms can be bonded to the adjacent carbon atoms in $-C_nH_{2n}-$, but two nitrogen atoms are not bonded to the same carbon atom. More specifically, there can be used not only polyamines such as diethylene triamine, triethylene tetraamine, tetraethylene pentaamine and dipropylene triamine, but also mixtures thereof and various purified polyamine materials. Still further, hydroxyalkyl substituted polyamines can be used in combination with the foregoing polyamines.

The polyamines have the formula

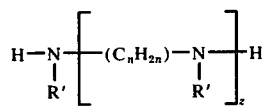

wherein $n$ is 1 to 6, $z$ is 2 to 4, and R', which can be the same or different, are hydrogen, alkyl of 1 to 4 carbon atoms or hydroxyalkyl having 1 to 4 carbon atoms.

In some cases, in order to change the density of hydrophilic groups in the resulting aqueous emulsion of this invention or to improve the properties of a film prepared from such emulsion, it is preferred to change or increase the distance between active hydrogen-containing amino groups in the polyurethane-urea-polyamine molecule.

This can be accomplished by replacing a part of the polyalkylene polyamine by ethylene diamine, propylene diamine, hexamethylene diamine and an adduct of such diamine to an alkylene oxide, acrylonitrile or an acrylic acid ester. In this case, up to 80 molar % of the polyalkylene polyamine can be replaced by a molar equivalent of the diamine. In general, up to 50 molar % of the polyalkylene polyamine is replaced for attaining the above purpose.

The preparation of the isocyanate-terminated urethane prepolymer is conducted in the presence of an inert solvent, such as benzene, or in the absence of a solvent. When an aromatic diisocyanaate is reacted with the polyhydroxyl compound, a reaction temperature of 60° to 100° C is used. When an aliphatic or alicyclic diisocyanate is used, a reaction temperature of 100° to 130° C is used.

In preparing the above urethane prepolymer, it is preferred that the amount of the diisocyanate is chosen so that all of the OH groups capable of reacting with the isocyanate groups are completely reacted. More specifically, it is preferred that the mole ratio of the total number of the NCO groups to the total number of the reactive hydrogen atoms (OH groups) be within a range of from 1.1 : 1 to 5.0 : 1.0.

The reaction between the isocyanate-terminated urethane prepolymer and the polyalkylene polyamine is preferably conducted in a ketone type solvent, under atmospheric pressure, at a temperature of from −20° to +70° C. As the ketone type solvent, there can be used, for example, acetone, methylethyl ketone, diethyl ketone, dipropyl ketone, methylisobutyl ketone and methyl isopropyl ketone. In view of their industrial availability, the use of acetone and methylethyl ketone is preferred. Further, a mixture of such ketone type solvent with benzene, tetrahydrofuran, dioxane, an acetic acid ester, dimethyl formamide or a chlorinated solvent can be used.

The reaction time is determined by the reaction temperature and the reactivity of the isocyanate-terminated urethane prepolymer. A longer reaction time or a shorter reaction time can be used depending on the reaction conditions. The reaction is continued until in the infrared absorption spectrum of the reaction product, the absorption at 2250 cm$^{-1}$ owing to the —N=C=O group disappears. In general, the reaction is completed in 0.5 to 2 hours.

In the reaction of the polyalkylene polyamine with the terminal isocyanate groups of the urethane prepolymer molecules, the isocyanate groups react preferentially with the secondary amino groups. It is critical that the total number of moles of the primary and secondary amino groups in the polyalkylene polyamine is greater than the total number of moles of the terminal isocyanate groups of the isocyanate-terminated urethane prepolymer. As the total number of moles of the amino groups approaches the total number of moles of the isocyanate groups, the molecular weight of the obtained polyurethane-urea-polyamine increases, and the product is gelled or has a great tendency to gelation. When the ratio of the total number of moles of the amino groups to the total number of moles of the isocyanate groups is excessively high, a polyurethane-urea-polyamine of a low molecular weight is formed, and a resin having excellent physical properties cannot be prepared from such an intermediate.

It is preferred that the ratio of the number (B) of moles of active hydrogen-containing amino groups to the number of moles (A) of isocyanate groups in the isocyanate-terminated urethane prepolymer is within a range of $1 < B/A \leq 5$, especially $1 < B/A \leq 3$.

It is preferred that the molecular weight of the polyurethane-urea-polyamine is within a range of from 5,000 to 100,000.

The following method is adopted for introduction a long-chain alkyl group into the polyurethane-urea-polyamine. More specifically, the introduction is accomplished by reacting the amino groups (primary and secondary) in the polyurethane-urea-polyamine molecule with a long-chain alkyl isocyanate having an alkyl group of 12 to 22 carbon atoms (including an alkyl isocyanate derived from 1 mole of a long-chain alcohol and 1 mole of a diisocyanate) or with an alpha-olefin epoxide having 12 to 22 carbon atoms.

As examples of alkyl isocyanates having an alkyl group of 12 to 22 carbon atoms that can be used in this invention, there can be mentioned dodecyl isocyanate, tetradecyl isocyanate, hexadecyl isocyanate, heptadecyl isocyanate, octadecyl isocyanate and mixtures thereof.

As examples of the alpha-olefin epoxides containing 12 to 22 carbon atoms, there can be mentioned dodecene oxide, tetradecene oxide, hexadecene oxide, octadecene oxide, eicosene oxide, docosene oxide and mixtures thereof.

The compound supplying the long-chain alkyl group is used in an amount of 10 to 80 mole %, preferably 20 to 60 mole %, based on the number of moles of amino groups (primary and secondary) in the polyurethane-urea-polyamine molecule. If the amount of the long-chain alkyl group is larger than 80 mole %, emulsification becomes difficult and if the amount of the long-chain alkyl group is smaller than 10 mole %, the fiber-softening effect of the emulsion is insufficient.

The reaction for introducing the long-chain alkyl group into the polyurethane-urea-polyamine is conducted in the same system as the system used for preparing the polyurethane-urea-polyamine, and is carried out subsequently to the preparation of the polyurethane-urea-polyamine. The above-mentioned long-chain compound is added to the polyurethane-urea-polyamine and then the reaction is conducted at 10° to 70° C for 1 to 5 hours under heating and agitation to effect the introduction.

Introduction of the long-chain alky group into the polyurethane-urea-polyamine molecule can also be accomplished by reacting an isocyanate-terminated urethane prepolymer with a polyamine having a long-chain alkyl group, but according to this method, it is difficult to obtain a product of high molecular weight. Accordingly, the intended introduction can be accomplished with greater assurance of success by the above-mentioned method employed in this invention, according to which a polyurethane-urea-polyamine is first formed and it is then reacted with a highly reactive compound such as a long-chain isocyanate or a long-chain epoxide.

The thus-prepared long-chain alkyl group-containing polyurethane-urea-polyamine is reacted with a cyclic dicarboxylic acid anhydride, and the resulting reaction mixture is mixed with an aqueous solution of a base. Then, the solvent used for the reaction is removed to form a self-emulsified polyurethane emulsion.

The long-chain alkyl group-containing polyurethane-urea-polyamine can first be reacted with epichlorohydrin (or epibromohydrin) and then converted to an anionic emulsion in the same manner as described above, whereby to obtain a reactive cross-linkable urethane emulsion. See U.S. Ser. No. 505,536, filed Sept. 13, 1974, the entire contents of which are incorporated herein by reference.

In this invention, as the cyclic dicarboxylic acid anhydride, there can be used, for example, maleic anhydride, succinic anhydride, phthalic anhydride, tetrahydrophthalic anhydride, hexahydrophthalic anhydride, trimellitic anhydride and itaconic anhydride. In general, the cyclic dicarboxylic acid anhydride is reacted with the long-chain alkyl group-containing polyurethane-urea-polyamine (1) in an amount equimolar to the unreacted amino groups of (1), at 10° to 60° C, for 0.5 to 3 hours.

As the aqueous solution of the base, there can be employed aqueous solutions of hydroxides, carbonates and bicarbonates of alkali metal such as sodium hydroxide, potassium hydroxide, lithium hydroxide, sodium carbonate, sodium bicarbonate and potassium carbonate, as well as ammonia, and lower amines represented by general formulae $RNH_2$, $R_2NH$ and $R_3N$ (in which R is alkyl having 1 to 4 carbon atoms, a hydroxyethyl group or a hydroxypropyl group).

In order to obtain a more reactive urethane emulsion, the long-chain alkyl group-containing polyurethane-urea-polyamine (1) is reacted with epichlorohydrin (or epibromohydrin) in an amount equimolar to the primary or secondary amino groups in the molecule of (1), at 40° to 70° C for 2 to 5 hours, and the reaction mixture is then rendered anionic in the same manner as described above.

When the polyurethane emulsion prepared according to this invention is used for the treatment of fiber-containing products, it imparts to the fibrous products not only elasticity and crease resistance, but also a soft touch. Further, when nonwoven fabrics, papers, leathers, rubbers, woods, metals, glasses and plastics are treated with this polyurethane emulsion by dipping or surface coating or spraying, and then drying, the effects of improved touch and physical properties can be attained. The polyurethane emulsion can be used for treatment of construction materials and as an adhesive. Furthermore, because the molecular structure of the resinous component of the emulsion is regarded as that of a polymeric surface active agent, the emulsion can be used not only as a binder but also as a surface active agent.

The polyurethane emulsion prepared according to this invention is a so-called self-emulsified emulsion, that is, it is free of an emulsifying agent. However, in order to improve the stability of the emulsion, a known emulsifying agent can be added in an amount such that the properties of the polyurethane resin is not drastically changed. Moreover, this emulsion can be used in combination with other resinous materials, provided that the mixed systems are stable.

The polyurethane emulsions usually contain from 5 to 50 weight percent of polyurethane resin substance.

This invention will now be further described in detail by reference to the following illustrative examples.

In the Examples all references to "parts" and "percent" are on a weight basis unless otherwise indicated.

EXAMPLE 1

34.8 parts (0.2 mole) of an 80 : 20 mixture of 2,4-tolylene diisocyanate and 2,6-tolylene diisocyanate and 90 parts of benzene were added to 202 parts (0.1 mole) of dehydrated polytetramethylene ether glycol (having an OH value of 55.3), and the mixture was agitated at 80° C for 1 hour. Then, the mixture was allowed to cool in air to room temperature (18°–25° C) to obtain a solution of a urethane prepolymer having an isocyanate group content of 2.50%.

A four-neck flask was charged with 250 parts of methylethyl ketone and 3.83 parts (0.037 mole) of diethylene triamine, and while the temperature of the charge was maintained below 10° C by external cooling with ice, 100 parts (0.030 mole) of the above prepolymer solution was gradually added dropwise to the charge of the flask over a period of 2 hours under agitation to obtain a polyurethane-urea-polyamine solution.

A small amount of this polymer solution was taken as a sample, and the infrared absorption spectrum of the sample was examined. It was found that the absorption at 2250 $cm^{-1}$ owing to the isocyanate group was not present.

Then, 4.44 parts (0.015 mole) of octadecyl isocyanate was added under agitation to the above polyurethane-urea-polyamine solution, and the temperature was elevated to 50° C and the reaction was conducted for 30 minutes. Then, 3.62 parts (0.037 mole) of maleic anhydride dissolved in 50 parts of methylethyl ketone was added to the reaction mixture at a temperature lower than 10° C under vigorous agitation over a period of a time as short as possible. The temperature was gradually elevated to 60° C over a period of about 1 hours to complete the reaction. Then, a solution of 1.5 parts of sodium hydroxide in 600 parts of water was added to the reaction mixture to effect neutralization and they were mixed sufficiently. The solvent was removed at 60° C under reduced pressure, and water was added to the residue to adjust the concentration.

Thus, there was obtained a stable low-viscosity aqueous emulsion having a resin content of 10%.

EXAMPLE 2

Instead of the octadecyl isocyanate used in Example 1, 3.90 parts (0.015 mole) of NEDOX 1518 OLEFIN OXIDE (ADM Chemicals, Ashland Oil & Refining CO.) (alpha-olefin epoxide having 15 to 18 carbon atoms on the average) was added to the polyurethane-urea-polyamine solution prepared as described in Example 1. The reaction was conducted at 50° C for 3 hours. Then, a solution of 5.10 parts (0.052 mole) of maleic anhydride in 50 parts of methylethyl ketone was added under vigorous agitation, at a temperature below 10° C over a period of a time as short as possible. The temperature of the reaction mixture was gradually elevated to 60° C over a period of 1 hour to complete the reaction. Then, a solution of 2.1 parts of sodium hydroxide in 600 parts of water was added to the reaction mixture to effect neutralization and they were mixed sufficiently. The solvent was removed at 60° C under reduced pressure, and water was added to the residue to adjust the concentration. Thus, there was obtained a low-viscosity stable aqueous emulsion having a resin content of 10%.

Comparative Example 1

The polyurethane-urea-polyamine solution obtained in Example 1 was directly reacted with 5.10 parts (0.052 mole) of maleic anhydride, without reaction with the octadecyl isocyanate as described in Example 1, and the reaction mixture was mixed sufficiently with a solution of 2.1 parts of sodium hydroxide in 600 parts of water to effect neutralization. The solvent was removed at 60° C under reduced pressure and water was added to the residue to adjust the concentration. Thus, there was obtained a low viscosity stable aqueous emulsion having a resin content of 10%.

EXAMPLE 3

According to the procedure described in Example 1, octadecyl isocyanate was reacted with the polyurethane-urea-polyamine solution, and then, 3.42 parts (0.037 mole) of epichlorohydrin was added to the reaction mixture and the reaction was further carried out at 50° C under agitation for 1 hour. Then, a solution of 3.62 parts (0.037 mole) of maleic anhydride in 50 parts of methylethyl ketone was added to the reaction mixture under vigorous agitation, at a temperature below 10° C, and the temperature was gradually elevated to 60° C over a period of about 1 hour to complete the reaction. Then, a solution of 1.5 parts of sodium hydroxide in 600 parts of water was added to the reaction mixture to effect neutralization and they were mixed sufficiently. The solvent was removed at 60° C under reduced pressure, and water was added to the residue to adjust the concentration. Thus, there was obtained a low-viscosity stable aqueous emulsion having a resin content of 10%.

Comparative Example 2

The polyurethane-urea-polyamine solution prepared as described in Example 1 was not reacted with octadecyl isocyanate as used in Example 1, but rather 4.81 parts (0.052 mole) of epichlorohydrin was added to the solution and they were reacted under agitation at 50° C for 1 hour. Then, a solution of 5.10 parts (0.052 mole) of maleic anhydride in 50 parts of methyl-ethyl ketone was added to the reaction mixture, at a temperature below 10° C under vigorous agitation, and then the temperature was gradually elevated to 60° C over a period of about 1 hour. Then, a solution of 2.1 parts of sodium hydroxide in 600 parts of water was added to the reaction mixture to effect neutralization, and post-treatments were carried out in the same manner as described in Example 1 to obtain a stable aqueous emulsion having a resin concentration of 10%.

EXAMPLE 4

4.81 parts of epichlorohydrin was added to the solution obtained in Example 2 by reaction with the alpha-olefin epoxide, and they were reacted at 50° C for 1 hour. Then, a solution of 5.10 parts of maleic anhydride in 50 parts of methylethyl ketone was added to the reaction mixture at about 10° C in a short time and the temperature was gradually elevated to 60° C to complete the reaction.

Post treatments were conducted in the same manner as in Example 2 to obtain a stable emulsion having a resin content of 10%.

EXAMPLE 5

Property Tests of Fabrics Processed with Anionic Emulsion:

Each of the emulsions prepared in the foregoing Examples 1 to 4, and Comparative Examples 1 and 2, can be applied to all kinds of fibers. In view of the compatibility of the emulsions with the chemicals to be used in combination therewith and the synergistic effects attained by the joint use of these chemicals, the best results were generally obtained when these emulsions were applied to woven and knitted fabrics of cellulose fibers.

Application of the emulsions to cotton fabrics will now be described by way of illustration.

Processing of Cotton No. 40 Broadcloth

Processing Conditions (preparation of test cloths):

A sample cloth was dipped in an anionic urethane emulsion having a solid content of 0.5% and squeezed with a mangle to a squeezing ratio of 70%, that is, the amount of emulsion impregnated into cloth was 70 percent by weight, based on the weight of the untreated cloth. Then, the cloth was dipped in the emulsion again and squeezed with the mangle in like fashion. Then, the cloth was dried for 3 minutes at 100° C by hot air and heat-set at 150° C for 3 minutes to obtain a sample cloth which was subjected to the following property tests.

Comparative test cloths were similarly prepared from treatments with the emulsions prepared in Comparative Examples 1 and 2. These test clothes and an untreated cloth were subjected to the following property tests.

Test Methods and Evaluation

1. Crease Resistance:

According to the method of JIS L-1042, the opened angle of the test cloth was measured by a Monsanto type tester in both the warp and weft directions and the crease resistance was evaluated based on the sum of the angles obtained with respect to the warp direction and to the weft direction. The measurement was conducted at a temperature of 25° C and a relative humidity maintained at 60%.

2. Softness:

The maximum bending load of the test cloth was determined with respect to both the warp direction and weft direction by using a Handle-o-meter (manufactured by Kumagaya Riki Kogyo K.K.), and the softness was evaluated based on the sum of the values obtained with respect to the warp direction and to the weft direction. A smaller value indicates a better softness.

3. Washing condition:

Washing a test cloth with a 0.2% synthetic detergent bath under usual domestic washing condition at 40° C.

Test Results

The test results are shown in the following Table.

Table

| Treating Agent | Properties Crease Resistance (°) (open angle) | | Softness (g) | |
|---|---|---|---|---|
| | as-finished | after 5 washings | as-finished | after 5 washings |
| Example 1 | 250 | 213 | 14.2 | 15.1 |
| Example 2 | 253 | 218 | 14.5 | 15.3 |
| Example 3 | 258 | 242 | 14.3 | 14.7 |
| Example 4 | 262 | 245 | 14.6 | 15.4 |
| Comparative Example 1 | 248 | 210 | 21.1 | 17.5 |
| Comparative Example 2 | 251 | 231 | 20.8 | 18.9 |
| Untreated Cloth | 162 | 165 | 15.8 | 15.5 |

The embodiments of the invention in which an exclusive property or privilege is claimed are defined as follows:

1. A process for preparing an anionic polyurethane aqueous emulsion, which comprises:
    1. reacting, in the liquid phase and in a ketone solvent, at a temperature of from −20° to +70° C, (A) isocyanate-terminated urethane prepolymer prepared by reacting organic polyol having a molecular weight in the range of from 200 to 10000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
    2. reacting with the polyurethane-urea-polyamine of step 1, a substance selected from the group consisting of alkyl isocyanates having an alkyl group containing 12 to 22 carbon atoms, and α-olefin epoxides having from 12 to 22 carbon atoms, to form an alkyl-substituted polyurethane-urea-polyamine, the amount of said substance being from 10 to 80 mole %, based on the number of moles of amino groups in the molecule of said polyurethane-urea-polyamine,
    3. reacting the reaction product of step 2 with a cyclic dicarboxylic acid anhydride in an amount equimolar to the number of moles of unreacted amino groups of said alkyl-substituted polyurethane-urea-polyamine, at 10° to 60° C, for 0.5 to 3 hours,
    4. adding to the reaction product of step 3 an aqueous solution of a base to form a neutralized emulsion,
    5. treating the product of step four to remove the organic solvent therefrom and thereby obtaining an aqueous anionic polyurethane emulsion as a final product.

2. A process according to claim 1, in which the reactant (B) includes up to 50 percent, by molecular equivalent, of diamines or alkylene oxide adducts, acrylonitrile adducts or acrylate adducts of diamines.

3. A process according to claim 1, in which the ratio of (B) the total mole number of amino groups containing active hydrogen atoms in the polyalkylene polyamine to (A) the total mole number of isocyanate groups in said urethane prepolymer is in the range of 1 <B/A ≦ 5.

4. A process according to claim 3, in which said polyalkylene polyamine has the formula

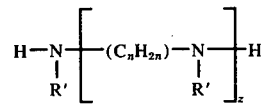

wherein $n$ is an integer larger than 1, $z$ is an integer from 2 to 4 and $R'$ is hydrogen, alkyl having 1 to 4 carbon atoms or hydroxyalkyl having 1 to 4 carbon atoms.

5. A process according to claim 4, in which said base is selected from the group consisting of alkali metal hydroxides, carbonates and bicarbonates, ammonia and amines having the formulas $RNH_2$, $R_2NH$ and $R_3N$, wherein R is alkyl having 1 to 4 carbon atoms, hydroxyethyl or hydroxypropyl.

6. A process according to claim 1, wherein the amount of said substance employed in step (2) is from 20 to 60 mole % based on the number of moles of amino groups in the molecule of the polyurethane-urea-polyamine.

7. A process according to claim 1, in which step (2) is carried out at a temperature of 10° to 70° C, for from 1 to 5 hours.

8. A process according to claim 1, in which between steps (2) and (3), the reaction product of step (2) is reacted with epichlorohydrin or epibromohydrin at 40° to 70° C, for 2 to 5 hours in an amount equimolar to the primary and secondary amino groups in the molecule of the alkyl-substituted polyurethane-urea-polyamine.

9. A process according to claim 1 in which said cyclic dicarboxylic acid anhydride is selected from the group consisting of maleic anhydride, succinic anhydride, phthalic anhydride, tetrahydrophthalic anhydride, hexahydrophthalic anhydride, trimellitic anhydride and itaconic anhydride.

10. An aqueous anionic polyurethane emulsion prepared by the process of claim 1.

11. A fibrous object having deposited thereon the solid components of the emulsion of claim 10.

* * * * *